United States Patent
Lentz

(10) Patent No.: US 9,879,539 B2
(45) Date of Patent: Jan. 30, 2018

(54) ENGINE AIRFOILS AND METHODS FOR REDUCING AIRFOIL FLUTTER

(71) Applicant: HONEYWELL INTERNATIONAL INC., Morristown, NJ (US)

(72) Inventor: Jeff Lentz, Chandler, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 451 days.

(21) Appl. No.: 14/546,186

(22) Filed: Nov. 18, 2014

(65) Prior Publication Data
US 2016/0138402 A1  May 19, 2016

(51) Int. Cl.
| F01D 5/12 | (2006.01) |
| F01D 5/14 | (2006.01) |
| F01D 5/16 | (2006.01) |
| F04D 29/32 | (2006.01) |

(52) U.S. Cl.
CPC .............. *F01D 5/141* (2013.01); *F01D 5/16* (2013.01); *F04D 29/324* (2013.01); *F05D 2220/323* (2013.01); *F05D 2220/36* (2013.01); *F05D 2250/70* (2013.01); *Y02T 50/671* (2013.01); *Y02T 50/673* (2013.01)

(58) Field of Classification Search
CPC .......... F01D 5/141; F01D 5/16; F04D 29/324; F05D 2250/70; F05D 2220/36; F05D 2220/323; Y02T 50/671; Y02T 50/673
See application file for complete search history.

(56) References Cited

U.S. PATENT DOCUMENTS

| 3,734,432 | A | 5/1973 | Low |
| 4,248,572 | A | 2/1981 | Fradenburgh |
| 4,459,083 | A | 7/1984 | Bingham |
| 4,512,718 | A | 4/1985 | Stargardter |
| 5,181,678 | A | 1/1993 | Widnall et al. |
| 6,471,482 | B2 | 10/2002 | Montgomery et al. |
| 7,476,086 | B2 | 1/2009 | Wadia et al. |
| 7,597,544 | B2 * | 10/2009 | Hasenjager ............. F01D 5/141 416/242 |
| 8,366,057 | B2 | 2/2013 | Vos et al. |
| 2011/0182741 | A1 | 7/2011 | Alexander |

(Continued)

FOREIGN PATENT DOCUMENTS

| DE | 102005025213 A1 | 12/2006 |
| EP | 2410130 A2 | 1/2012 |

OTHER PUBLICATIONS

O.G. McGee III et al; Three-Dimensional Tailored Vibration Response and Flutter Control of High-Bypass Shroudless Aeroengine Fans, Journal of Vibration and Acoustics, vol. 135, No. 2, Mar. 18, 2013.

(Continued)

*Primary Examiner* — Richard Chang
(74) *Attorney, Agent, or Firm* — Lorenz & Kopf, LLP

(57) ABSTRACT

A method is provided for designing an airfoil. The method includes considering a baseline airfoil having a first camber distribution and a first aerodynamic efficiency; reducing the first camber distribution to result in a reduced camber airfoil with a second camber distribution and a second aerodynamic efficiency such that the second aerodynamic efficiency is approximately equal to the first aerodynamic efficiency; and producing the airfoil with the second camber distribution.

19 Claims, 7 Drawing Sheets

(56) References Cited

U.S. PATENT DOCUMENTS

2013/0149109 A1  6/2013  Webster
2013/0202445 A1  8/2013  Hart et al.

OTHER PUBLICATIONS

A.J. Sanders et al; Investigation of the Flow Physics Driving Stall-Side Flutter in Advanced Forward Swept Fan Designs, Dec. 31, 2003.
Extended EP Search Report for Application No. EP 15193992.3-1610 dated May 10, 2016.
Ahmadi, D. et al.; Analyzing the effects of airfoil camber on flutter suppression using Roger's approximation technique and Timoshenko theory; Scientific Research and Essays vol. 6(12), pp. 2413-2425, Jun. 18, 2011; Available online at http://www.academicjournals.org/SRE DOI: 10.5897/SRE10.206 ISSN 1992-2248 © 2011 Academic Journals.
Li, R.; Numerical Investigation of the Influence of Front Camber on the Stability of a Compressor Airfoil; 2005 University of Kentucky UKnowledge Graduate School.

* cited by examiner

ENGINE AIRFOILS AND METHODS FOR REDUCING AIRFOIL FLUTTER

TECHNICAL FIELD

The following discussion generally relates to gas turbine engine, and more particularly, to airfoils in gas turbine engines with improved flutter characteristics.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section, and an exhaust section. The fan section is positioned at the front or inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section includes one or more axial flow compressors that raise the pressure of the air received from the fan section to a relatively high level. The compressed air from the compressor section then enters the combustor section, where one or more fuel nozzles injects fuel into the compressed air. The fuel-air mixture is ignited in the combustor section to generate combustion gases. The high-energy combustion gases from the combustor section then flow into and through the turbine section to generate energy. The air exiting the turbine section is exhausted from the engine via the exhaust section.

The fan, compressor, and turbine sections include rotor components, typically formed by airfoils extending from a disk, which in turn is mounted on a central engine shaft. As noted above, the turbine rotor components are driven by the high energy combustion gases to drive the engine shaft, and the rotating engine shaft drives the fan and compressor rotor components to draw or compressor air. The airfoils of these components are aerodynamically configured in profile for efficiently performing the designated function.

Engine designers deal with a number of issues, some of which compete with one another. For example, typically, engine designers attempt to reduce the weight of various components, including the airfoils, to provide improved fuel efficiency. Similarly, the geometric characteristics of the airfoil may be designed to maximize aerodynamic efficiency. However, some of these functions or purposes may adversely impact other relevant parameters. As an example, airfoils rotate, they tend to vibrate, and reduced weight airfoils may be more prone to lower frequency vibrations that, in turn, may result in undesirable flutter behavior. Such flutter may adversely impact the efficiency and useful life of the airfoil.

Accordingly, it is desirable to provide engine airfoils that result in improved reliability, robustness, and/or efficiency. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for designing an airfoil. The method includes considering a baseline airfoil having a first camber distribution and a first aerodynamic efficiency; reducing the first camber distribution to result in a reduced camber airfoil with a second camber distribution and a second aerodynamic efficiency such that the second aerodynamic efficiency is approximately equal to the first aerodynamic efficiency; and producing the airfoil with the second camber distribution.

In accordance with another exemplary embodiment, a method is provided for designing an airfoil. The method includes generating an aerodynamic baseline airfoil profile with a first camber distribution and a first aerodynamic efficiency; reducing the first camber distribution so long as the first aerodynamic efficiency is not substantially adversely reduced to result in a reduced camber airfoil profile; and producing the airfoil according to the reduced camber airfoil profile.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
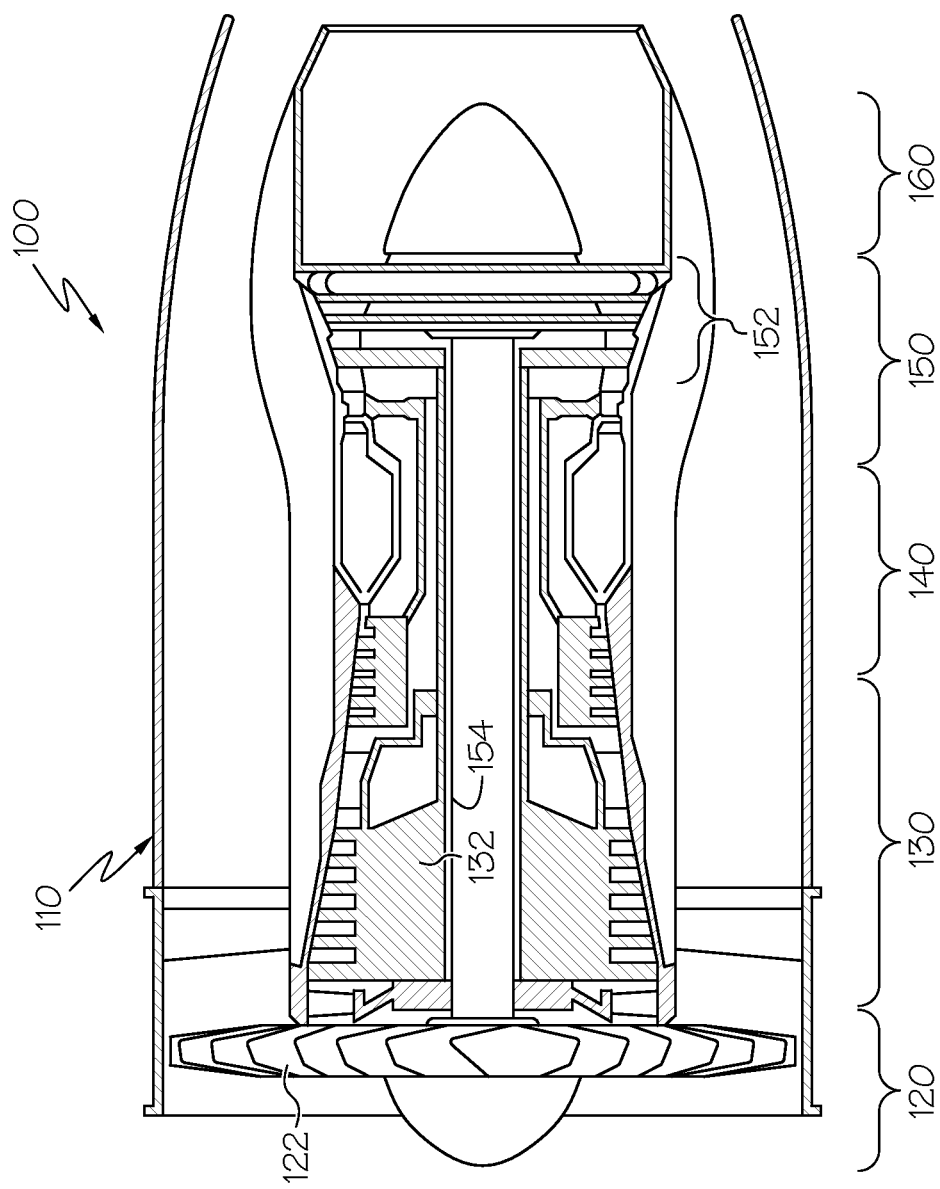
FIG. 1 is a simplified cross-sectional side view of a gas turbine engine according to an exemplary embodiment.

FIG. 1 is a simplified, cross-sectional view of a gas turbine engine 100 according to an embodiment. The engine 100 may be disposed in an engine case 110 and may include a fan section 120, a compressor section 130, a combustor section 140, a turbine section 150, and an exhaust section 160. The fan section 120 may include a fan 122, which draws in and accelerates at least a portion of the air into the compressor section 130. The compressor section 130 may include one or more compressors 132 (e.g., a low, intermediate, and/or high pressure compressors) that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through the exhaust section 160. In one embodiment, the turbines 152 rotate to drive equipment in the engine 100 via concentrically disposed shafts or spools. Specifically, the turbines 152 may drive the compressors 132 via one or more rotors 154. FIG. 1 depicts one exemplary configuration, and other embodiments may have alternate arrangements. The exemplary embodiments discussed herein are not limited to use in conjunction with a particular type of turbine engine.

Figure 2:
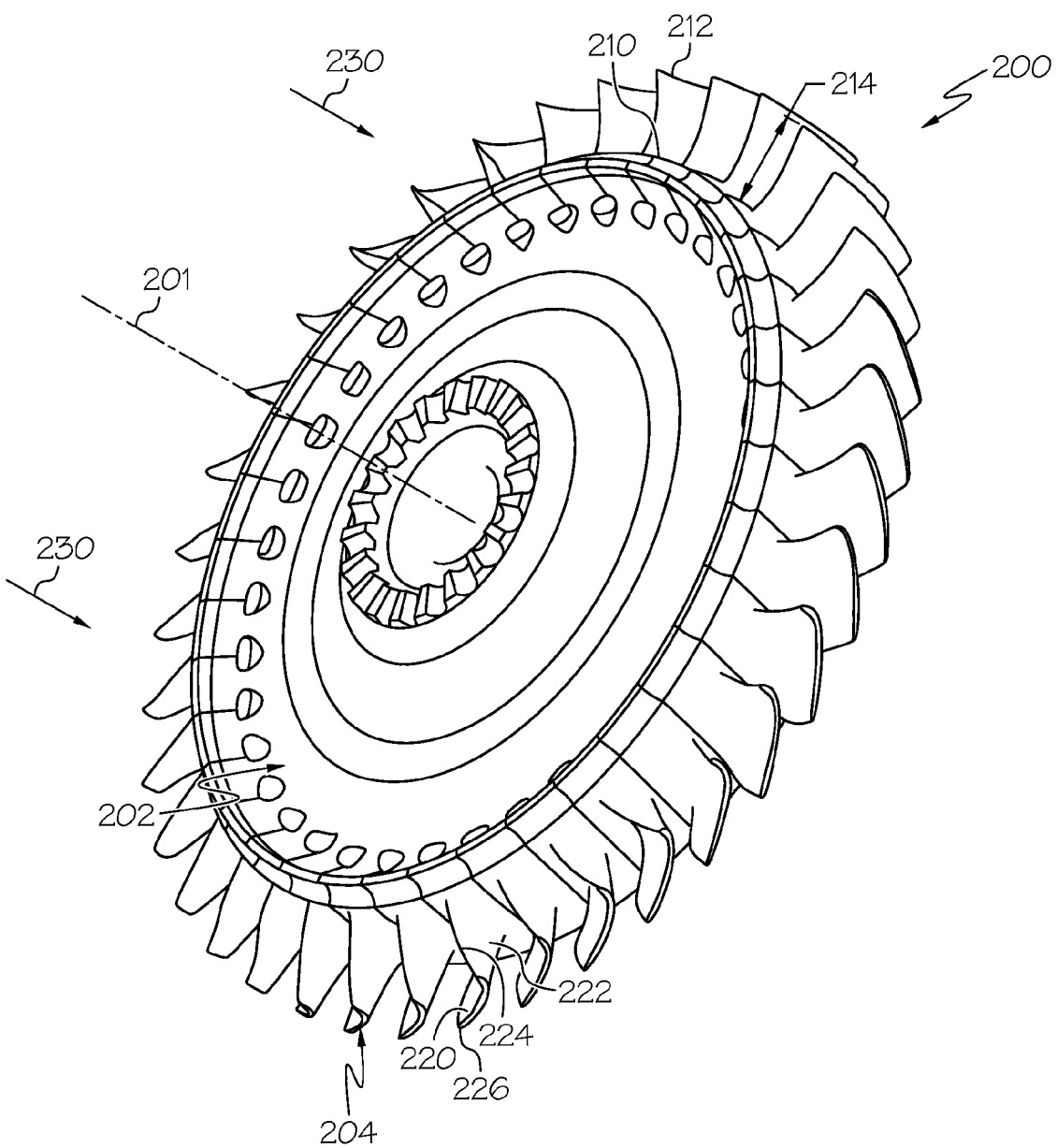
FIG. 2 is an isometric view of a rotor component that may be implemented in the gas turbine engine of FIG. 1 in accordance with an exemplary embodiment.

FIG. 2 is an isometric view of a rotor component 200 that may be implemented in the gas turbine engine 100 of FIG. 1 in accordance with an exemplary embodiment. The rotor component 200 in FIG. 2 is depicted with reference to an engine axis 201. In the discussion below, the term axial generally refers to a direction parallel to the engine axis 201, and the term radial generally refers to a direction perpendicular to the axial direction, particularly a direction extending between the engine axis 201 and the periphery of the rotor component 200.

The rotor component 200 includes a rotor disk 202 and a plurality of airfoils 204 extending in a radial direction about the periphery of the rotor disk 202. The airfoils 204 may be formed integral with the rotor disk 202 or as individual airfoil components that are inserted into appropriately sized slots. The particularly arrangement of airfoils 204 relative to the rotor disk 202 may vary.

Generally, each airfoil 204 may be considered to extend radially from a root 210 to a tip 212 to result in a height 214. As described in greater detail below, each airfoil 204 may be considered to include a pressure side wall 220 and a suction side wall 222 that are joined at a leading edge 224 and a trailing edge 226. The terms "leading" and "trailing" generally refer to the direction of engine airflow, which in FIG. 2 is represented by arrows 230.

In general, the rotor component 200 may be incorporated into one or more of the engine sections described above. For example and additionally referring to FIG. 1, the rotor component 200 may be incorporated into the fan section 120 such that, as the component 200 rotates, the airfoils 204 function to draw air into the engine 100. Further, the rotor component 200 may be incorporated into the compressor section 130 such that, as the component 200 rotates, the airfoils 204 function to compress the air flowing through the airfoils 202. Finally, the rotor component 200 may be incorporated into the turbine section 150 such that air flowing therethrough strikes the airfoils 204 to rotate the component 200 for energy extraction. Generally, the airfoils 204 may take any one or more of a number of different forms, and the rotor component 200 may be implemented in connection with any one or more components or sections of any number of different types of engines. Additional details about the design and implementation of the airfoils 204 are provided below. Generally, the exemplary embodiments discussed below are applicable to, as examples, inserted airfoils; integral blisks; and/or fully machined, EDM, forged, and/or multi-piece designs joined as a weldment or bolted configurations.

Figure 3:
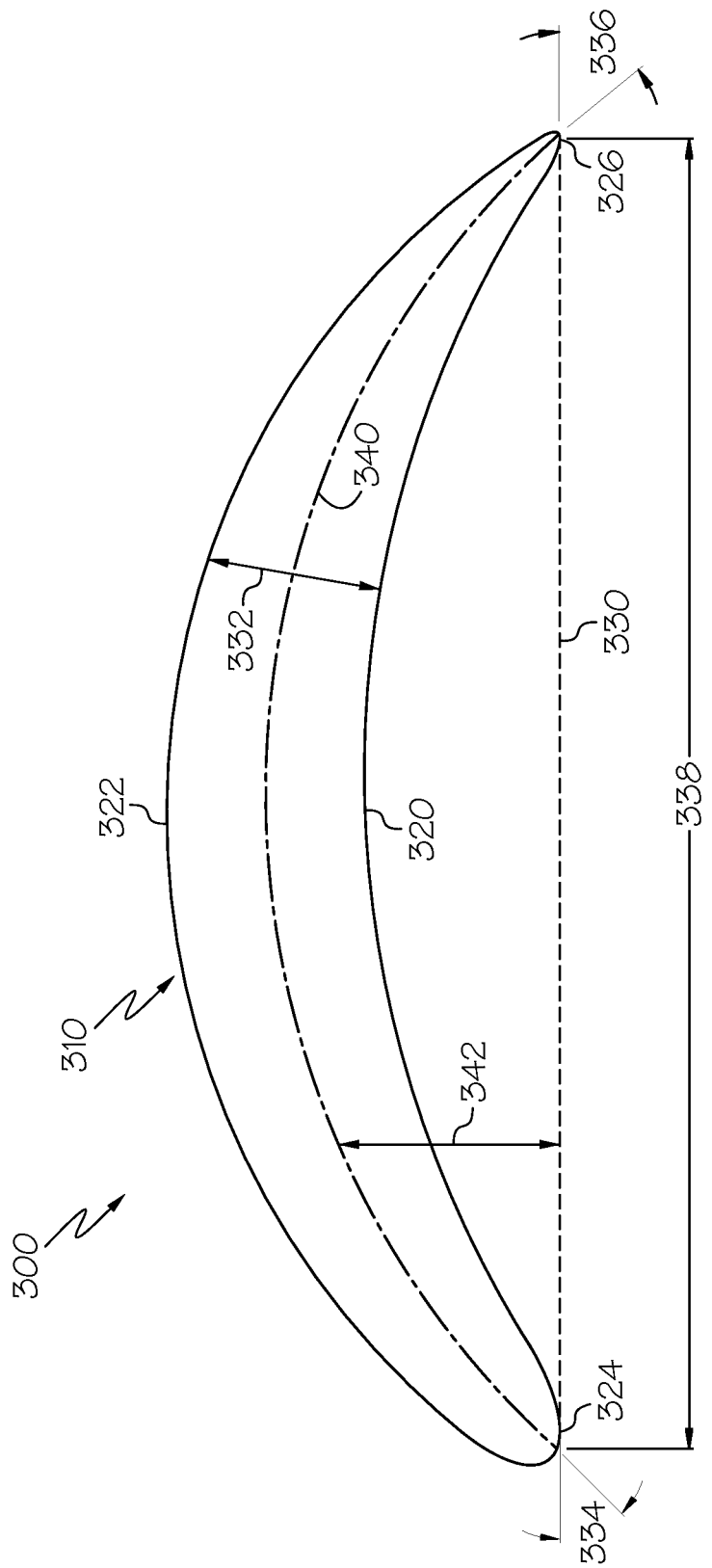
FIG. 3 is a cross-sectional view of an exemplary airfoil.

FIG. 3 is a cross-sectional view of an airfoil 300 provided to describe various parameters associated with the description of exemplary embodiments discussed below. The airfoil 300 may represent one or more of the airfoils 204 discussed above with reference to FIG. 2. The cross-sectional view of FIG. 3 is in an axial-circumferential plane at a radial position on the airfoil 300. In the discussion below, the cross-sectional view of FIG. 3 may be referred to as an airfoil profile 310. The shape and dimensions of the airfoil profile 310 may impact both aerodynamic and structural properties of the airfoil 300.

As noted above, the airfoil 300 extends in a radial direction from root to tip such that a number of cross-sectional views such as that shown in FIG. 3 may be considered along the radial height or distance. In effect, profiles such as profile 300 are "stacked" to form the complete airfoil. The cross-sectional characteristics may differ along the radial height. In the discussion below, a radial location for a particular airfoil profile may be referenced as a radial percentage, e.g., between 0%-100% along the radial height from root to tip. For example, a cross-sectional view of the airfoil at the root will be considered at a location of approximately 0%; a cross-sectional view of the airfoil equidistance between the root and tip will be considered at a location of approximately 50%; and so on. The airfoil profile 300 of FIG. 3 may represent any radial position and is merely described below to define the relevant parameters.

As introduced above, the airfoil profile 300 is formed by a generally concave pressure side wall 320 and a generally convex suction side wall 322 that are joined a leading edge 324 and a trailing edge 326. The airfoil profile 300 may be considered to have a thickness 332 that is the distance between the pressure side wall 320 and the suction side wall 322. As shown, the thickness 332 may vary between the leading edge 324 and trailing edge 326, and additionally, the thickness 332 may further vary between root to tip. The local thicknesses 332 along the chord and/or along the height may be considered a thickness distribution. In the depicted embodiment, thickness 332 is considered the distance between the walls 320, 322 in an orientation perpendicular to a camber line 340, which is discussed in greater detail below. In further embodiments, thickness may be considered to be the distance between the walls 320, 322 in an orientation perpendicular to one of the walls 320 (or 322) and the resulting intersection with the other wall 322 (or 320).

The airfoil profile 300 is further defined by a chord line 330 extending as a straight line between the leading edge 324 and trailing edge 326. The distance between the leading and trailing edges 324, 326 is referred to as the chord length 338. In some instances, characteristics of the airfoil profile 300 may be referenced as a relative position or percentage along the chord line 330 such that the chord position at the leading edge 324 is 0% and the chord position at the trailing edge 326 is 100%.

The airfoil profile 300 is further defined by an arcuate camber line 340 representing a meanline spaced equidistantly between the pressure side wall 320 and suction side wall 322 from leading edge 324 to trailing edge 326. Local camber 342 may be defined as the distance between the camber line 340 and the chord line 330 at a particular chord position or camber position along the span of the airfoil profile. As shown, the local camber 342 may vary between the leading edge 324 and the trailing edge 326. Additionally, the airfoil profile 300 may have a total camber that represents, in effect, a combination of the local cambers 342. As one exemplary quantitative description, in the view of FIG. 3, the total camber is represented by the area between the camber line 340 and the chord line 330. Generally, the terms "camber" or "camber distribution" refer to the local camber, the total camber, or a combination of the local camber and total camber. The airfoil profile 300 further includes a leading edge angle 334 formed between a tangent of the camber line 340 at the leading edge 324 and the chord line 330 and a trailing edge angle 336 formed between a tangent of the camber line 340 at the trailing edge 326 and the chord line 330.

Generally, various aspects of the airfoil 300 may be designed to provide desirable performance characteristics, such as aerodynamic efficiency. Such aspects considered with respect to aerodynamic efficiency may include, as examples, airfoil height, chord length, thickness, the distribution and magnitude of local camber, angle of attack with respect to airflow, leading edge angle, trailing edge angle, airfoil twist, airfoil lean, airfoil sweep, and airfoil spacing. Many of these aspects may be considered with respect to both local characteristics (e.g., chord and/or height positions) as well as overall. Additional details regarding the airfoil design are provided below to provide both aerodynamic advantages and secondary or additional advantages.

Figure 4:
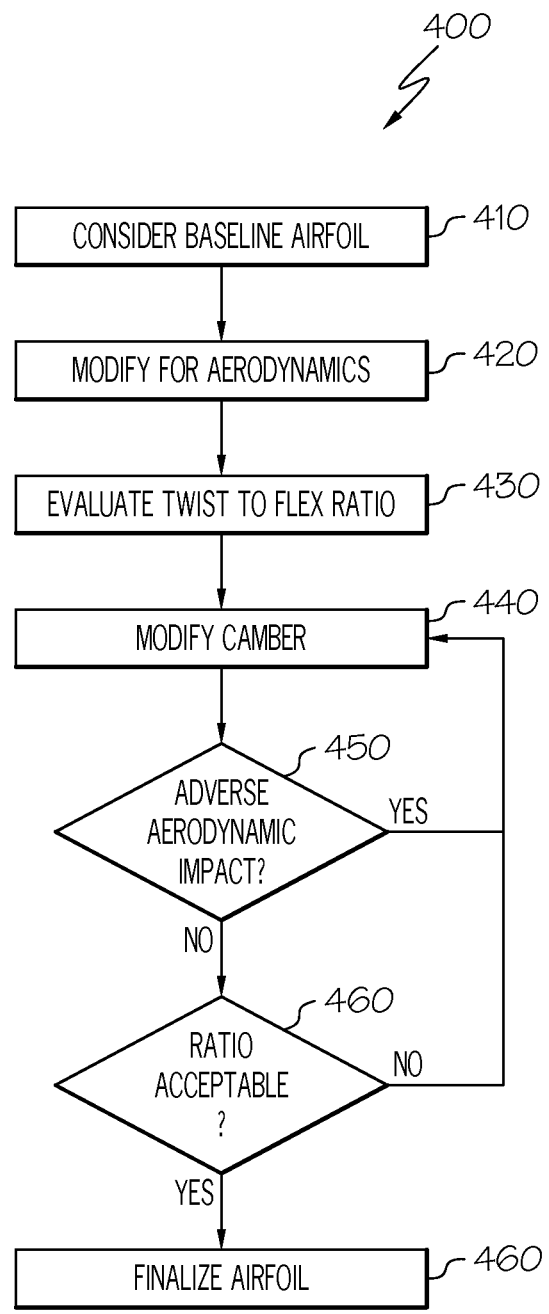
FIG. 4 is a flowchart of a method for designing rotor components in accordance with an exemplary embodiment.

FIG. 4 is a flow chart of a method 400 for designing airfoils in accordance with an exemplary embodiment. Such airfoils may be incorporated into the rotor component 200 of FIG. 2.

In a first step 410, a baseline airfoil is considered. The baseline airfoil may be any suitable airfoil. In a second step 420, the baseline airfoil may be modified and/or optimized for aerodynamic properties. In one exemplary embodiment, such modifications function to reduce undesirable flow separation and optimize velocity distributions, thereby improving efficiency. Any suitable parameter may be considered, including airfoil height, chord length, the distribution and magnitude of thicknesses, the distribution and magnitude of local camber, angle of attack with respect to airflow, leading edge angle, trailing edge angle, airfoil twist, airfoil lean, airfoil sweep, and airfoil spacing. These parameters may be modified with respect to each radial height of the airfoil, as well as each position along the chord. Generally, computer software may be used to create a number of possible designs, which are then tested according to operating conditions in order to model performance of the respective design and identify the designs that perform as desired. At this point, the modified or aerodynamic baseline airfoil has been optimized according to aerodynamic principles, such as efficiency.

As noted above, in one exemplary embodiment, the aerodynamic baseline airfoil of step 410 may be optimized or otherwise designed to operate with an aerodynamic efficiency. Aerodynamic efficiency (or peak efficiency) may be measured and/or quantified with respect to an airfoil in a number of ways. In one exemplary embodiment, the aerodynamic efficiency of a compressor airfoil is evaluated according to three-dimensional calculation metrics, such as the Navier-Stokes equations that function to describe the efficiency of the airfoil on a scale from 0 to 100, representing the ratio of work actually applied to the fluid by a given increase in pressure to the ideal work (e.g., at isentropic conversion) that would need to be supplied for the same increase in pressure. For turbine airfoils, a similar determination may be made with respect to a ratio of actual work output relative to ideal work output. Other aerodynamic efficiency metrics may be considered with respect to lift to drag ratios and velocity distributions over the surface of one or both sides.

In a third step 430, the twist to flex ratio of the aerodynamic baseline airfoil from step 420 may be evaluated. The fundamental mode twist to flex ratio generally refers to the set of criteria for establishing the stability of structures. As such, for any section of an airfoil, the twist to flex ratio is the amount of torsional rotation of the section relative to the amount of translational displacement of the section from the mode of vibration. In accordance with one exemplary embodiment, it has been determined that twist to flex ratio is related to airfoil flutter. Airfoil flutter is an aeroelastic oscillatory instability in a potential flow field that exists when the airfoil can longer absorb any vibratory energy. Generally, this may be considered the continued and increasing oscillation of an airfoil, which is sustained only by the movement of a fluid over it at a constant speed. As system damping approaches zero, the airfoil may develop a large oscillatory response of the airfoil. As the airfoil twists and bends, the air flow over the airfoil body may changes, thereby creating changes in pressure difference. When this occurs, it creates the possibility that the airfoil will continue bending and twisting at growing magnitudes and is the onset of the flutter phenomenon, which may lead to undesirable issues. As such, it is generally desirable to decrease the twist to flex ratio in order to minimize the propensity of airfoil flutter.

In a fourth step 440, the aerodynamic baseline profile is modified to decrease the camber distribution. As the camber distribution is decreased, the remaining parameters of the aerodynamic baseline airfoil are generally maintained. For example, one or more of the airfoil height, chord length, thickness, angle of attack with respect to airflow, leading edge angle, trailing edge angle, airfoil twist, airfoil lean, airfoil sweep, and airfoil spacing of the aerodynamic baseline airfoil may be maintained. Generally, to the extent that these parameters are considered, most or all of these parameters may be maintained. As a result of this approach, even though the camber distribution is decreased, the aerodynamic or performance characteristics of the aerodynamic baseline airfoil profiles may be maintained. Additional details about the nature of the camber reduction and the resulting aerodynamic efficiency are provided below. After the conclusion of step 440, the airfoil may be considered a reduced camber airfoil. Additional details about step 440 are provided with reference to FIGS. 5-7.

Figure 5:
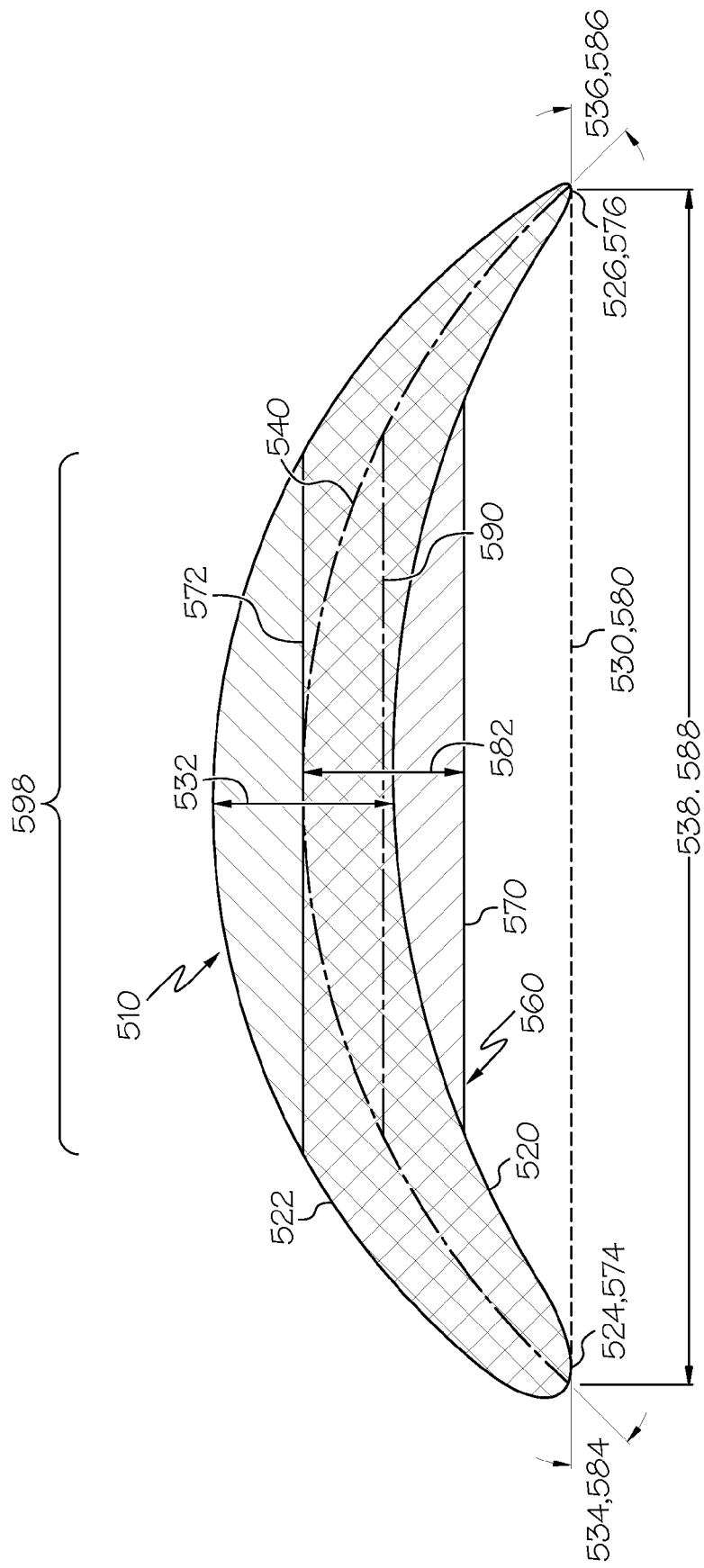
FIGS. 5-7 are airfoil profiles that may be implemented in the rotor component in FIG. 2 in accordance with an exemplary embodiment.

As an example, FIG. 5 is a cross-sectional view of an airfoil 500 with two different profiles 510, 560. For clarity, the profiles 510, 560 are provided with hashmarks having different orientations. As such, portions of the profiles 510, 560 have both hashmarks. The profiles 510, 560 may represent any radial height along the airfoil 500.

Profile 510 represents an aerodynamic baseline profile, such as that discussed in step 420, in which a baseline profile has been modified to result in advantageous aerodynamic properties. As also discussed above, profile 510 has by a generally concave pressure side wall 520 and a generally convex suction side wall 522 that are joined a leading edge 524 and a trailing edge 526. The profile 510 further has a thickness 532 that varies along the length of the airfoil profile 510. The chord line 530, chord length 538, and camber line 540 for the profile 510 are additionally depicted, as well as the leading and trailing edge angles 534, 536.

Profile 560 represents a reduced camber airfoil profile, such as that discussed in step 440, in which an aerodynamic baseline profile has been modified to reduce the camber distribution. As also discussed above, profile 560 has by a generally concave pressure side wall 570 and a generally convex suction side wall 572 that are joined a leading edge 574 and a trailing edge 576. The profile 560 further has a thickness 582 that varies along the length of the airfoil profile 560. The chord line 580, chord length 588, and camber line 590 for the profile 560 are additionally depicted, as well as the leading and trailing edge angles 584, 586.

Profile 560 particularly represents the reduced camber airfoil profile relative to the aerodynamic baseline airfoil profile 510. In other words, profile 560 is the same as profile 510, except that the camber distribution has been reduced. As such, and as depicted in FIG. 5, the profiles 510, 560 have the same leading edges 524, 574, the same trailing edges 526, 576, the same leading edge angles 534, 584, the same trailing edge angles 536, 586, the same chord lines 530, 580, and the same chord lengths 538, 588. As a result of these characteristics, profile 560 has approximately the same aerodynamic advantages as profile 510.

However, in contrast to profile 510, the profile 560 has a reduced camber distribution. In particular, the local camber in one or more areas has been reduced by moving the camber line 590 closer to the chord line 580. In one exemplary embodiment, the thickness 582 (and/or thickness distribution) of the profile 560 is the same as the thickness 532 (and/or thickness distribution) of the profile 510 along the entire chord lengths 538, 588. As a result, the pressure side wall 570 and suction side wall 572 have also been moved closer to the chord line 580 at distances equal to that of the modified camber line 590. In effect, and as shown in FIG. 5, this results in a less concave pressure side wall 570.

The nature and amount of camber reduction may vary. Generally, such modifications may be determined with models and/or finite element analysis. In one exemplary embodiment, the camber reductions may occur by generating a finite element model of the airfoil; mapping discrete locations along the airfoil; reducing the camber of the locations, individually and in combination, to generate a number of designs; modeling the performance of the designs with computational fluid dynamics; and choosing one or more designs that perform as desired, In the exemplary embodiment of FIG. 5, the reduction in camber distribution is a result of reducing the local camber in positions along a continuous portion 598 of the chord length. In particular, the portion 598 extends from approximately 30% of the chord length 588 to approximately 80% of the chord length 588. As indicated by camber line 590, the amount of camber reduction gradually increases (e.g., diverges from original camber line 540) from the 30% position to a maximum reduction at approximately the 50% position and gradually decreases (e.g., converges to the original camber line 540) to the 80% position. In the depicted exemplary embodiment, the amount of maximum reduction is approximately one half of the thickness 532, although this quantity may vary.

Figure 6:
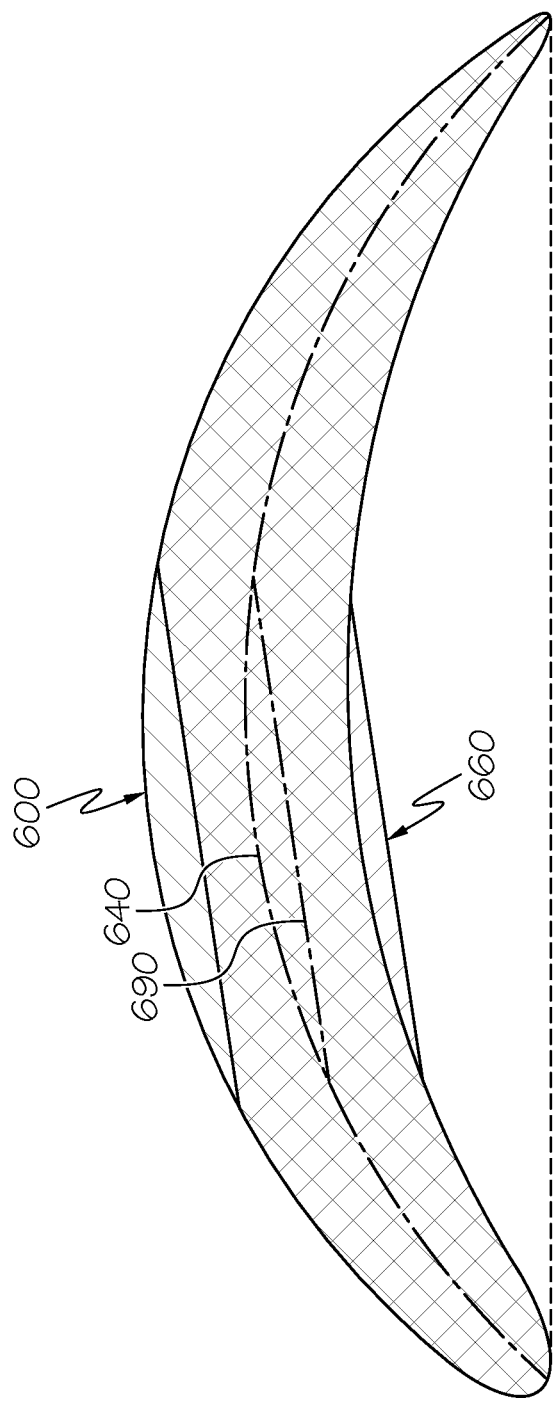
Figure 7:
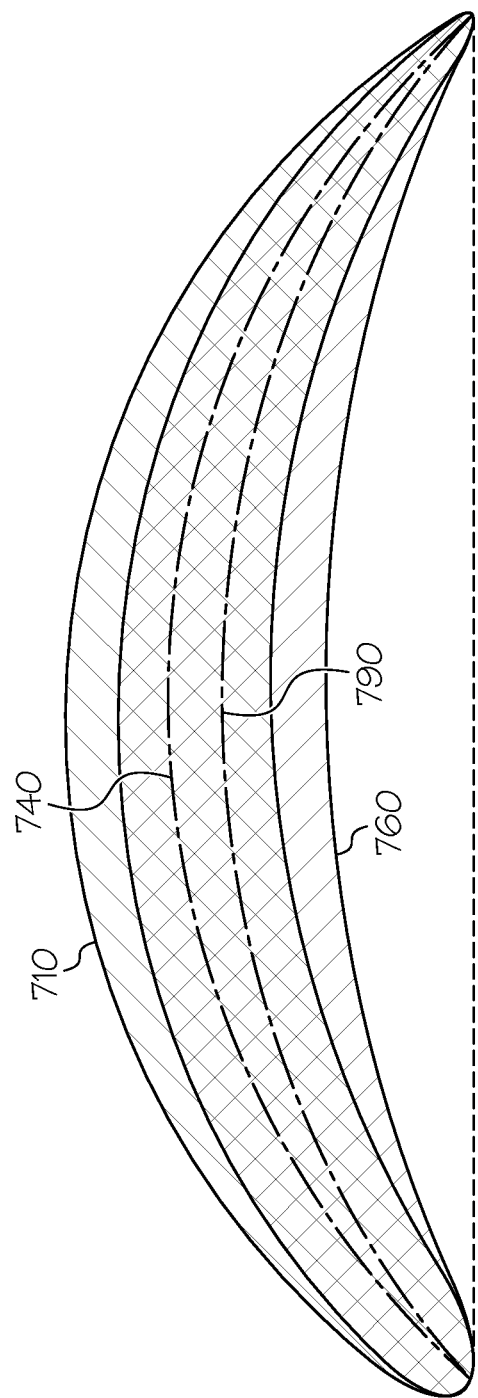

Additional examples of camber modifications are depicted in FIGS. 6 and 7. For example, FIG. 6 depicts an aerodynamic baseline profile 610 and a corresponding reduced camber profile 660. As above, the characteristics of the profiles 610, 660 are generally the same, except that the camber distribution of profile 660 has been reduced. As shown by a comparison of the camber lines 640, 690, the local camber has been reduced from an approximate 25% position to an approximate 60% position. As another example, FIG. 7 depicts an aerodynamic baseline profile 710 and a corresponding reduced camber profile 760. As above, the characteristics of the profiles 710, 760 are generally the same, except that the camber distribution of profile 760 has been reduced. As shown by a comparison of the camber lines 740, 790, the local camber has been reduced from an approximate 5% position to an approximate 95% position.

Returning to FIG. 4, in a step 450, the aerodynamic efficiency of the reduced camber airfoil from step 440 is evaluated. As noted above, the camber modification from step 440 should not substantially impact the aerodynamic efficiency. As such, the reduced camber airfoil profile from step 440 is evaluated with respect to aerodynamic efficiency and compared to the aerodynamic efficiency of the aerodynamic baseline profile from step 420. If the aerodynamic efficiencies are substantially different, then the method 400 may return to step 440. In such a situation, the performance penalty for the airfoil camber modification may be considered too high. However, the aerodynamic efficiency of the reduced camber airfoil is approximately equal to the aerodynamic efficiency of the baseline airfoil (or demonstrates a relative improvement), then the method 400 proceeds to step 460.

In step 450, any differences in aerodynamic efficiency may be evaluated in various ways. In one exemplary embodiment, an aerodynamic efficiency difference of 0.5% or less may be considered approximately the same. In other embodiments, an aerodynamic efficiency difference of 5%, 1% or 0.1% or less may be considered approximately the same (or considered to be not a substantial adverse impact). In further embodiments, any differences may be considered with respect to design intent. In other words, the airfoil designers may have an acceptable predetermined efficiency, and as long as the efficiency of the modified airfoil profile is equal to or better than the acceptable efficiency, the modified airfoil profile may be considered to not have a substantial adverse impact.

In a step 460, the twist to flex ratio of the reduced camber airfoil from step 440 is evaluated. In one exemplary embodiment, it has been determined that a reduction in camber tends to reduce the twist to flex ratio of the resulting airfoil. As such, the airfoils resulting from step 440 should have a lower twist to flex ratio than the airfoils prior to step 440. As introduced above, the twist to flex ratio is a result of the vibratory mode shape deflections, and the vibratory mode shape is the result of the geometry of the airfoil, particularly the camber distribution. As such, the camber distribution is directly related to camber distribution, and the vibratory mode shape for a particular airfoil shape may be determined by finite element analysis. If the twist to flex ratio is acceptable, the method 400 proceeds to step 470. If the twist to flex ratio is unacceptable, the method 400 returns to step 440 and the camber of the airfoil is further modified and/or reduced.

Generally, an acceptable twist to flex ratio may be selected based on a number of factors. In one exemplary embodiment, the acceptable twist to flex ratio may be determined empirically according to known operating conditions. In other exemplary embodiments, an acceptable twist to flex ratio may be relative to twist to flex ratios of previous iterations of steps 440, 450, and 460. In other words, steps 440, 450, and 460 may be repeated as long as the twist to flex ratio continues to improve while being able to maintain the aerodynamic advantages from step 420 and evaluated in step 450. As noted above, the improved twist to flex ratio advantageously results in improved flutter characteristics. As such, repeated iterations provide an improvement in flutter characteristics from camber modifications without substantial adverse impact on aerodynamic performance.

In one exemplary embodiment, it has been determined that modifying camber in particular regions of the airfoil provides improved twist to flex ratios without substantially impacting the performance characteristics. As an example, the camber distributions may be particularly reduced between approximately 25%-75% along the radial height and between approximately 25%-75% along the chord length. In this example, the camber distributions may be maintained in the areas outside these ranges. Generally, these spans or areas are merely examples of camber modifications that may provide beneficial results.

In a final step 470, the airfoil design is finalized with the reduced camber airfoil, manufactured, installed (or manufactured with) a rotor component (e.g., rotor component 200 of FIG. 2), and assembled into engine (e.g., engine 100 of FIG. 1). Airfoils according to the exemplary embodiments discussed above may be formed from the same types of materials, and in the same manner, e.g., molded, folded or machined, as that used to form conventional airfoils. The airfoils may have a substantially solid design or can be configured having a hollow or cored out design, depending on the particular application.

Accordingly, exemplary embodiments discussed above provide airfoils, rotor components, and engines with improved durability without substantially impacting the aerodynamic performance or efficiency. Such improvements may result in the ability to operate at higher temperatures, increased speeds, and/or lighter materials, thereby enabling further performance and efficiency improvements. Exemplary embodiments are applicable to both commercial and military gas turbine engines and auxiliary power units. Moreover, exemplary embodiments may find beneficial uses in many industries, including aerospace and particularly in high performance aircraft, as well as automotive, marine and power generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for designing an airfoil, the method comprising the steps of:
   considering a baseline airfoil having a first camber distribution and a first aerodynamic efficiency;
   reducing the first camber distribution to result in a reduced camber airfoil with a second camber distribution and a second aerodynamic efficiency, wherein the second aerodynamic efficiency is approximately equal to the first aerodynamic efficiency; and
   producing the airfoil with the second camber distribution, wherein the reducing step includes reducing the first camber distribution in one or more areas within a range between approximately 25% to approximately 75% along a radial height and maintaining the first camber distribution outside of the range.

2. The method of claim 1, wherein the baseline airfoil has a first chord length, and wherein the producing step further includes producing the airfoil with the first chord length.

3. The method of claim 2, wherein the baseline airfoil has a first thickness distribution, and wherein the producing step further includes producing the airfoil with the first thickness distribution.

4. The method of claim 3, wherein the baseline airfoil has a first leading edge angle and a first trailing edge angle, and wherein the producing step further includes producing the airfoil with the first leading edge angle and the first trailing edge angle.

5. The method of claim 1, wherein the baseline airfoil has a leading edge and a trailing edge, and wherein the reducing step includes reducing the camber distribution while maintaining the leading edge and the trailing edge.

6. The method of claim 1, wherein the baseline airfoil has a first twist to flex ratio, and wherein the reducing step includes reducing the twist to flex ratio.

7. The method of claim 6, wherein the reducing step is repeated until the twist to flex ratio reaches a predetermined value.

8. The method of claim 6, wherein the reducing step is repeated until the twist to flex ratio is minimized.

9. The method of claim 1, wherein the reducing step includes reducing the first camber distribution in one or more areas within a range between approximately 25% to approximately 75% along a chord length and maintaining the first camber distribution outside of the range.

10. A method for designing an airfoil, the method comprising the steps of:
    considering a baseline airfoil having a first camber distribution and a first aerodynamic efficiency;
    reducing the first camber distribution to result in a reduced camber airfoil with a second camber distribution and a second aerodynamic efficiency, wherein the second aerodynamic efficiency is approximately equal to the first aerodynamic efficiency; and
    producing the airfoil with the second camber distribution, wherein the reducing step includes reducing the first camber distribution in one or more areas within a range between approximately 25% to approximately 75% along a chord length and maintaining the first camber distribution outside of the range.

11. The method of claim 10, wherein the baseline airfoil has a first leading edge angle and a first trailing edge angle, and wherein the producing step further includes producing the airfoil with the first leading edge angle and the first trailing edge angle.

12. The method of claim 10, wherein the baseline airfoil has a first twist to flex ratio, and wherein the reducing step includes reducing the twist to flex ratio.

13. The method of claim 12, wherein the reducing step is repeated until the twist to flex ratio reaches a predetermined value.

14. The method of claim 12, wherein the reducing step is repeated until the twist to flex ratio is minimized.

15. A method for designing an airfoil, the method comprising the steps of:
    considering a baseline airfoil having a first camber distribution and a first aerodynamic efficiency;
    reducing the first camber distribution to result in a reduced camber airfoil with a second camber distribution and a second aerodynamic efficiency, wherein the second aerodynamic efficiency is approximately equal to the first aerodynamic efficiency; and
    producing the airfoil with the second camber distribution, wherein the reducing step includes reducing the first camber distribution in one or more areas within a first range between approximately 25% to approximately 75% along a radial height and within a second range between approximately 25% to approximately 75% along a chord length.

16. The method of claim 15, wherein the reducing step further includes maintaining the first camber distribution outside of the first range and the second range.

17. The method of claim 15, wherein the baseline airfoil has a first twist to flex ratio, and wherein the reducing step includes reducing the twist to flex ratio.

18. The method of claim 17, wherein the reducing step is repeated until the twist to flex ratio reaches a predetermined value.

19. The method of claim 17, wherein the reducing step is repeated until the twist to flex ratio is minimized.

* * * * *